(12) United States Patent
Yu et al.

(10) Patent No.: US 8,926,340 B2
(45) Date of Patent: Jan. 6, 2015

(54) SPRING PLATE TYPE CONNECTOR FOR USE IN BACKLIGHT MODULE

(75) Inventors: Gang Yu, Guangdong (CN); Jiaqiang Wang, Guangdong (CN)

(73) Assignee: Shenzhen China Bar Optoelectronics Technology Co., Ltd., Shenzhen, Guangdong (CN)

( * ) Notice: Subject to any disclaimer, the term of this patent is extended or adjusted under 35 U.S.C. 154(b) by 233 days.

(21) Appl. No.: 13/581,801

(22) PCT Filed: Aug. 14, 2012

(86) PCT No.: PCT/CN2012/080123
§ 371 (c)(1),
(2), (4) Date: Aug. 30, 2012

(87) PCT Pub. No.: WO2014/023037
PCT Pub. Date: Feb. 13, 2014

(65) Prior Publication Data
US 2014/0038446 A1 Feb. 6, 2014

(51) Int. Cl.
*H01R 12/72* (2011.01)
*H01R 13/46* (2006.01)
*G02F 1/13* (2006.01)
*H01R 13/24* (2006.01)

(52) U.S. Cl.
CPC *H01R 13/46* (2013.01); *G02F 1/13* (2013.01); *H01R 13/2457* (2013.01)
USPC .............................................. 439/79; 439/65

(58) Field of Classification Search
USPC .......................................... 439/79–83, 65–74
See application file for complete search history.

(56) References Cited

U.S. PATENT DOCUMENTS

| | | | | | |
|---|---|---|---|---|---|
| 3,290,637 | A | * | 12/1966 | Yuska | 439/79 |
| 4,303,291 | A | * | 12/1981 | Dines | 29/843 |
| 5,588,849 | A | * | 12/1996 | Kile | 439/83 |
| 6,461,183 | B1 | * | 10/2002 | Ohkita et al. | 439/342 |
| 6,969,261 | B2 | * | 11/2005 | Harris et al. | 439/65 |
| 7,988,471 | B2 | * | 8/2011 | Matsumoto et al. | 439/159 |

* cited by examiner

*Primary Examiner* — Truc Nguyen
(74) *Attorney, Agent, or Firm* — Andrew C. Cheng

(57) ABSTRACT

The present invention discloses a spring plate type connector for use in backlight module, which includes a retention base and a plurality of connection bodies. The plurality of connection bodies is integrally formed on the retention base. The retention base includes a corresponding structure of a component contained in the backlight module. The connection body includes: a connection section, which is connected to the retention base; and an engagement section, which extends from the connection section and is connected to a solder pad inside the backlight module. Practicing the spring plate type connector for use in backlight module simplifies the manufacture process of the connector, realizes expanded range of application, and allows of application to connection with backlight modules of various models, thereby improving sharability of the connector and making the backlight module compact and light-weighted.

4 Claims, 2 Drawing Sheets

SPRING PLATE TYPE CONNECTOR FOR USE IN BACKLIGHT MODULE

CROSS REFERENCE TO RELATED APPLICATIONS

This application claims the priority of Chinese Patent Application No. 201210276723.5 filed on Aug. 6, 2012, the disclosure of which is incorporated herein by reference in its entirety.

BACKGROUND OF THE INVENTION

1. Field of the Invention

The present invention relates to the field of liquid crystal panel manufacturing, and in particular to a spring plate type connector for use in backlight module.

2. The Related Arts

A conventional connector for backlight module is generally assembled with mutual insertion. For example, to assemble, two ends of a connector are respectively inserted into sockets form in two or more than two components of the backlight module to which power is to be supplied. A connector of such a structure shows the following deficiencies:

(1) For backlight modules of different sizes, since the assembled positions of the internal components to be connected are different, power supplying for backlighting can only be effected through use of connectors of different specifications. This causes certain troubles for assembling operation and is detrimental to the management of part numbers of connectors.

(2) The connector needs various pick-and-place operations and multiple specifications are generally detrimental to simplification of the process and may cost a high expense.

(3) The conventional connector is bulky and is thus adverse to saving of space, making it unfit to the solution for connection in the future development of slim bezel for backlight modules.

SUMMARY OF THE INVENTION

The technical issue to be addressed by the present invention is to provide a spring plate type connector for use in backlight module, which simplifies the manufacture process of the connector, realizes expanded range of application, and allows of application to connection with backlight modules of various models, thereby improving sharability of the connector and making the backlight module compact and light-weighted.

The technical solution of the present invention is as follows.

A spring plate type connector for use in backlight module comprises a retention base and a plurality of connection bodies, the plurality of connection bodies being integrally formed on the retention base, the retention base comprising a corresponding structure of a component contained in the backlight module;

the connection body comprises:

a connection section, which is connected to the retention base; and an engagement section, which extends from the connection section and is connected to a solder pad inside the backlight module.

Preferably, the connection bodies are made in the form of strips by stamping; and the engagement sections comprise flat surfaces that are raised with respect to the connection sections.

Preferably, the engagement sections have an end in the form of a hook and having an outer wall that forms a flat surface.

Preferably, the connection sections of the plurality of connection bodies are arranged on a surface of the retention base in an equally spaced manner.

The spring plate type connector for use in backlight module according to the present invention has the following efficacies. Since a plurality of connection bodies is integrally formed on the retention base and the connection bodies comprise engagement sections that are connectable to solder pads contained in the backlight module and the retention base comprises a corresponding structure of a component of the backlight module, the manufacture process of the connector is simplified, realizing expanded range of application of the spring connector to allow of application to connection with backlight modules of various models, thereby improving sharability of the connector and making the backlight module compact and light-weighted.

DETAILED DESCRIPTION OF THE PREFERRED EMBODIMENTS

Figure 1:
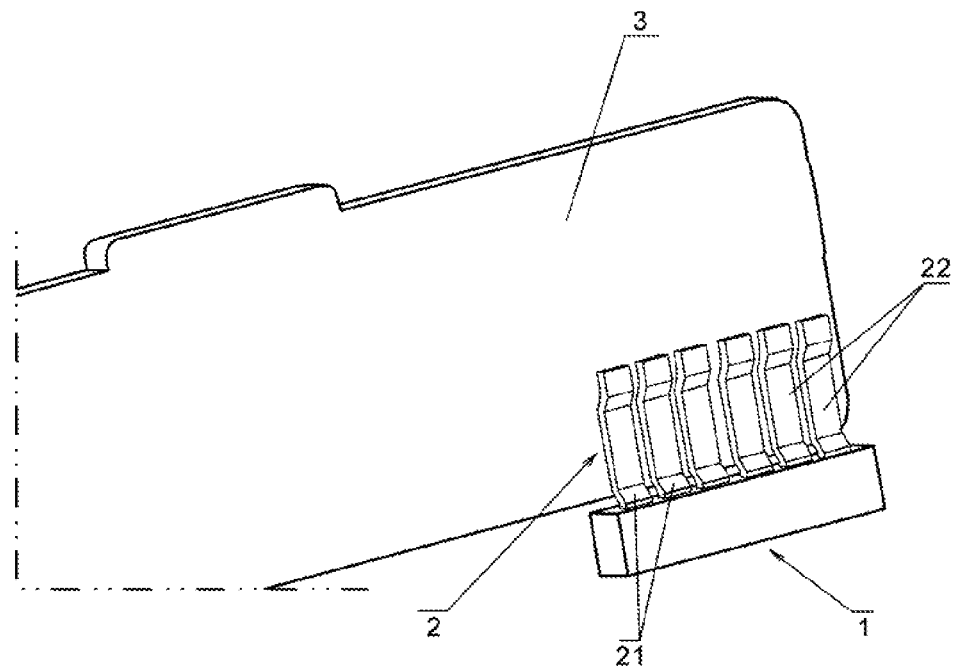
FIG. 1 is a schematic view showing an assembling structure of a spring plate type connector for use in backlight module according to a first embodiment of the present invention for connection with an internal component of the backlight module.
Figure 2:
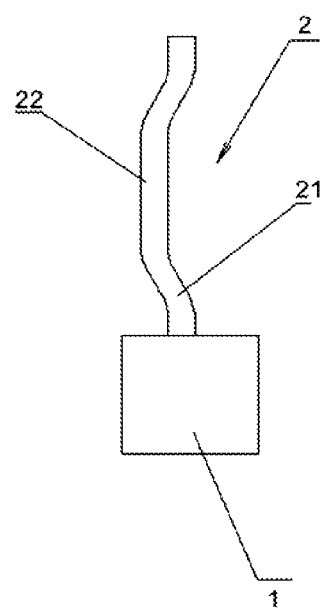
FIG. 2 is a cross-sectional view of the spring plate type connector for use in backlight module according to the present invention shown in FIG. 1.

A description will be given to preferred embodiments of the present invention, reference being had to the attached drawings.

The embodiments of the present invention provide a spring plate type connector for use in a backlight module, which functions to connect a component of the backlight module to effect power supplying for backlighting and comprises a retention base 1 and a plurality of connection bodies 2. The plurality of connection bodies 2 is integrally formed on the retention base 1. The retention base 1 comprises a corresponding structure of a component contained in the backlight module.

Each connection body 2 comprises:

a connection section 21, which is connected to the retention base 1; and an engagement section 22, which extends from the connection section 1 and is connected to a solder pad inside the backlight module.

Referring to FIG. 1, the connector for use in backlight module according to the present invention is a structure that functions to connect two or more than two components inside the backlight module to which power is to be supplied so as to effect power supplying. In the following, connection with a backlight component 3 and a component 1 of the spring plate type connector shown in FIG. 1 is taken as an example to describe the structure of the spring connector for use in backlight module according to the present invention.

Embodiment 1

Each connection body 2 is made in the form of a strip by stamping in such a way that the engagement section 22 comprises a flat surface that is raised with respect to the connection section 21. In the instant embodiment, the retention base 1 is made in the form of a block, which is one of the components of the backlight module to be electrically connected. The plurality of connection bodies 2 is integrally formed on the retention base 1 and is arranged to be uniformly distributed with constant spacing distance therebetween so as to be lined up along the same straight line on the surface of the retention base 1.

The regularly arranged plurality of connection bodies 2 is of the purpose to have multiple engagement sections 22 of the plurality of connection bodies 2 form a flat surface for engaging solder pads inside the backlight module thereby increasing the contact area between the connector and the solder pads to ensure reliable connection.

The engagement sections 22 are arranged to raise with respect to the connection sections 21 so as to allow the engagement sections 22 to tightly engage and depress the solder pads (located at the lower left corner of the backlight module component 3 shown in FIG. 1) within the range of elasticity thereof.

Embodiment 2

Figure 3:
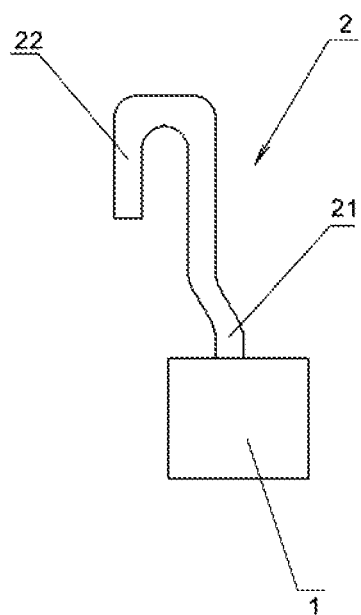
FIG. 3 is a cross-sectional view of a spring plate type connector for use in backlight module according to a second embodiment of the present invention.

Referring to FIG. 3, the engagement section 22 has an end section that is made in the form of a hook and has an outside wall that forms a flat surface. In the embodiment, the connection body 2 has an end fixed to the retention base 1 and an opposite end that is bent to form a hook. The hooked ends have outer walls serving as engagement surfaces with solder pads and arranged to form a flat surface. Further, in the embodiment, the plurality of connection bodies 2 is arranged in an equally spaced manner to increase the contact area between the connector and the solder pads thereby ensuring reliable connection.

Since the connection bodies 2 are integrally formed on the retention base 1 and the retention base 1 comprises a fixed structure formed on a component of the backlight module, the spring plate type connector having the above described structure allows of simplification of the manufacture of spring plate type connector and also realizes expanded range of application of the connector, namely being applicable to the connection with backlight modules of various models, thereby improving sharability of the connector and also helping easing management of part numbers.

In a practical application of the spring plate type connector for use in backlight module according to the present invention, when it is attempted to assemble a corresponding component inside the backlight module, the installation of the connector can be carried out without adopting an assembling process for insertion.

Since the connection body 2 comprises a connection section 21 and an engagement section 22, in the process of assembling the above mentioned component, the flat surface of the engagement section 22 can press the solder pad inside the backlight module to effect supply of power.

In other embodiments of the spring plate type connector for use in backlight module according to the present invention, the retention base 1 can be a fixing structure other than a to-be-connected component contained in the backlight module, provided that the spring type connector can be properly retained. Further, the connection body can be of other different shapes, provided that an engagement section 22 is provided for connecting a solder pad inside a backlight module.

In the embodiment of the spring plate type connector for use in backlight module according to the present invention, since a plurality of connection bodies is integrally formed on the retention base and the connection bodies comprise engagement sections that are connectable to solder pads contained in the backlight module and the retention base comprises a corresponding structure of a component of the backlight module, the manufacture process of the connector is simplified, realizing expanded range of application of the spring connector to allow of application to connection with backlight modules of various models, thereby improving sharability of the connector and making the backlight module compact and light-weighted.

What is claimed is:

1. A spring plate type connector for use in backlight module, which functions to connect a component of the backlight module to effect power supplying for backlighting and comprises a retention base and a plurality of connection bodies, characterized in that the plurality of connection bodies is integrally formed on the retention base, the retention base comprising a corresponding structure of a component contained in the backlight module;

the connection body comprises:

a connection section, which has an end that is connected and fixed to the retention base and an opposite end; and an engagement section, which comprises a hook that has an outer wall forming a flat surface and is formed on and extends from the opposite end of the connection section so as to be elastically supported by the connection section for making the flat surface in elastic engagement with a solder pad inside the backlight module.

2. The spring plate type connector for use in backlight module according to claim 1, characterized in that the connection sections of the plurality of connection bodies are arranged on a surface of the retention base in an equally spaced manner.

3. The spring plate type connector for use in backlight module according to claim 1, characterized in that the connection bodies are made in the form of strips by stamping; the engagement sections comprise flat surfaces for engagement with the connection sections.

4. The spring plate type connector for use in backlight module according to claim 3, characterized in that the connection sections of the plurality of connection bodies are arranged on a surface of the retention base in an equally spaced manner.

* * * * *